(12) United States Patent
Walter

(10) Patent No.: US 10,890,142 B2
(45) Date of Patent: Jan. 12, 2021

(54) DEVICE FOR CONTROLLING THE AMOUNT OF FLUID FED TO THE INTAKE OF A SUPERCHARGED INTERNAL-COMBUSTION ENGINE EQUIPPED WITH AN EXHAUST GAS RECIRCULATION CIRCUIT AND METHOD USING SAME

(71) Applicant: IFP Energies nouvelles, Rueil-Malmaison (FR)

(72) Inventor: Bruno Walter, Chagnon (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 25 days.

(21) Appl. No.: 15/902,043

(22) Filed: Feb. 22, 2018

(65) Prior Publication Data
US 2018/0238274 A1 Aug. 23, 2018

(30) Foreign Application Priority Data
Feb. 23, 2017 (FR) ...................................... 17 51406

(51) Int. Cl.
*F02M 26/06* (2016.01)
*F02M 26/10* (2016.01)
(Continued)

(52) U.S. Cl.
CPC ........... *F02M 26/06* (2016.02); *F02B 37/168* (2013.01); *F02B 37/22* (2013.01);
(Continued)

(58) Field of Classification Search
CPC ........ F02M 26/06; F02M 26/10; F02M 26/22; F02B 37/168; F02B 37/22; F04D 41/0007; F04D 41/0047; Y02T 10/144; Y02T 10/47
(Continued)

(56) References Cited

U.S. PATENT DOCUMENTS 4,112,684 A * 9/1978 Tholen ................. F02B 37/166
60/606
4,404,805 A * 9/1983 Curtil ..................... F02B 37/16
60/606
(Continued)

FOREIGN PATENT DOCUMENTS

DE 102015006288 A1 12/2015
DE 102015015794 A1 8/2016
(Continued)

OTHER PUBLICATIONS

Preliminary Search Report, dated Oct. 17, 2017; submitted herewith (2 pgs.).
(Continued)

*Primary Examiner* — Thai Ba Trieu
(74) *Attorney, Agent, or Firm* — Fitch, Even, Tabin & Flannery, L.L.P.

(57) ABSTRACT

A device for controlling the amount of fluid fed to the intake of a supercharged internal-combustion engine includes at least one turbocharger with a compression stage including at least one compressor with an intake for the fluid to be compressed, an expansion stage with at least one turbine having at least one exhaust gas inlet and expanded exhaust gas outlet, a transfer line for carrying the compressed fluid from the compressor outlet to the at least one turbine inlet with throttling means for controlling the compressed fluid transfer to the turbine, and an exhaust gas recirculation line between exhaust gas outlet of turbine and intake of compressor.

14 Claims, 2 Drawing Sheets

(51) Int. Cl.
 *F02M 26/22* (2016.01)
 *F02B 37/16* (2006.01)
 *F02B 37/22* (2006.01)
 *F02D 41/00* (2006.01)
 *F01N 3/10* (2006.01)

(52) U.S. Cl.
 CPC ..... *F02D 41/0007* (2013.01); *F02D 41/0047* (2013.01); *F02M 26/10* (2016.02); *F02M 26/22* (2016.02); *F01N 3/10* (2013.01); *Y02T 10/12* (2013.01); *Y02T 10/40* (2013.01)

(58) Field of Classification Search
 USPC .................................. 60/605.2, 606
 See application file for complete search history.

(56) References Cited

U.S. PATENT DOCUMENTS

| | | | | |
|---|---|---|---|---|
| 4,561,253 A * | 12/1985 | Curtil | ............... | F02B 37/16 60/606 |
| 4,833,886 A * | 5/1989 | Meier | ............... | F02B 37/16 60/606 |
| 6,216,458 B1 * | 4/2001 | Alger | ............... | F02M 26/10 60/605.2 |
| 6,324,846 B1 * | 12/2001 | Clarke | ............... | F01N 3/306 60/605.2 |
| 6,435,166 B1 * | 8/2002 | Sato | ............... | F02D 21/08 123/568.12 |
| 6,470,682 B2 * | 10/2002 | Gray, Jr. | ............... | F02M 26/06 60/605.2 |
| 7,168,250 B2 * | 1/2007 | Wei | ............... | F02B 37/013 123/568.12 |
| 7,836,693 B2 * | 11/2010 | Fujita | ............... | F02D 41/0052 123/568.11 |
| 8,056,339 B2 * | 11/2011 | Lippa | ............... | F02D 21/08 60/605.2 |
| 8,230,675 B2 * | 7/2012 | Pursifull | ............... | F02D 21/08 60/605.2 |
| 8,353,275 B2 * | 1/2013 | VanDerWege | ............... | F02M 26/06 60/605.2 |
| 2004/0050375 A1 * | 3/2004 | Arnold | ............... | F02B 37/18 123/568.12 |
| 2005/0103013 A1 * | 5/2005 | Brookshire | ............... | F02B 37/001 60/605.2 |
| 2013/0096807 A1 * | 4/2013 | Bresch-Pietri | ............... | F02D 41/0072 701/108 |
| 2013/0305715 A1 * | 11/2013 | Rollinger | ............... | F02B 37/00 60/605.2 |
| 2013/0305716 A1 * | 11/2013 | Rollinger | ............... | F02D 41/10 60/605.2 |
| 2016/0090903 A1 * | 3/2016 | Almkvist | ............... | F02B 37/18 60/602 |
| 2016/0326972 A1 | 11/2016 | Kim et al. | | |
| 2016/0348615 A1 * | 12/2016 | Fischer | ............... | F02M 26/05 |
| 2017/0037797 A1 * | 2/2017 | Liu | ............... | F02D 41/0052 |

FOREIGN PATENT DOCUMENTS

DE 102015109223 A1 12/2016
GB 2504713 A 2/2014
JP 2007198310 A * 8/2007

OTHER PUBLICATIONS

M. V. Harish Babu. "Why Do Engine Manufacturers Mostly Prefer HP EGR Over LP EGR?" Quora article dated Jan. 13, 2017. https://www.quora.com/Why-do-engine-manufacturers-mostly-prefer-HP-EGR-over-LP-EGR.
EGR—Exhaust Gas Recirculation. http://www.sttemtec.com/en/egr/egr.php.

* cited by examiner

DEVICE FOR CONTROLLING THE AMOUNT OF FLUID FED TO THE INTAKE OF A SUPERCHARGED INTERNAL-COMBUSTION ENGINE EQUIPPED WITH AN EXHAUST GAS RECIRCULATION CIRCUIT AND METHOD USING SAME

CROSS-REFERENCE TO RELATED APPLICATIONS

This application claims the benefit of French Patent Application No. 17/51.406 filed Feb. 23, 2017, the contents of which is incorporated herein by reference as if fully rewritten herein.

FIELD OF THE INVENTION

The present invention relates to a device for controlling the amount of fluid fed to the intake of a supercharged internal-combustion engine equipped with an exhaust gas recirculation circuit and to a method using same.

In particular, the present invention is suited for internal-combustion engines, notably diesel engines, such as those used for motor or industrial vehicles, or stationary equipments.

As is widely known, the power delivered by an internal-combustion engine depends on the amount of air fed to the combustion chamber, which itself is proportional to the density of this air.

Thus, it is usual to increase this amount of air through compression of the outside air before it is allowed into this combustion chamber. This operation, known as supercharging, can be carried out using any means such as a turbocharger or a driven compressor, which can be a centrifugal or a positive-displacement compressor.

In case of supercharging using a turbocharger, the latter comprises a rotary single-flow or double-flow turbine connected by a shaft to a rotary compressor. The exhaust gas from the engine flows through the turbine, which is then rotated. This rotation is thereafter transmitted to the compressor which, by its rotation, compresses the outside air before it is fed to the combustion chamber.

BACKGROUND OF THE INVENTION

As is better described in French patent application No. 2,478,736, it is planned to increase the compression of the outside air by the compressor even further so as to be able to significantly raise this amount of compressed air in the compression chamber of the engine.

This is achieved in particular by increasing the rotation speed of the turbine and therefore of the compressor.

Part of the compressed air exiting the compressor is therefore diverted using a fluid intensifier circuit known as Boost circuit so as to be directly admitted to the turbine inlet while mixing with the exhaust gas. This turbine is then traversed by a larger amount of fluid (mixture of compressed air and exhaust gas), which allows the rotation speed of the turbine, and therefore of the compressor, to be increased. This compressor speed increase thus allows to raise the pressure of the outside air that is compressed in this compressor prior to being fed to the combustion chamber of the engine.

Thus, the compressed air has a higher density, which allows the amount of air contained in the combustion chamber to be increased.

This type of supercharged engine, although satisfactory, however involves some not insignificant drawbacks.

Thus, one of the main difficulties with a fluid intensifier circuit (Boost circuit) lies in its compatibility with the exhaust gas recirculation (EGR) to the engine intake.

Indeed, most diesel engines are equipped with an exhaust gas recirculation circuit referred to as EGR circuit for limiting NOx emissions at source.

Exhaust gas recirculation is generally achieved by means of an EGR circuit collecting the exhaust gas at the engine outlet and sending it downstream from the intake air compressor.

The circulation of the recirculated exhaust gas being the exact opposite of the circulation of the diverted air from the fluid intensifier circuit, there is a risk of conflict between the two circuits with cancellation of the effects. It is therefore necessary to define a specific air loop architecture allowing the Boost circuit and the EGR circuit to be made compatible.

The present invention relates to an optimized air loop and exhaust gas recirculation architecture allowing to use, within a single engine, the Boost circuit and the EGR circuit while preventing a risk of conflict between the two circuits and too high a complexity for the respective lines and controls.

SUMMARY OF THE INVENTION

Thus, the present invention relates to a device for controlling the amount of air fed to the intake of a supercharged internal-combustion engine comprising at least one turbocharger with a compression stage including at least one compressor with an intake for the fluid to be compressed connected to a delivery line, an expansion stage with at least one turbine having at least one exhaust gas inlet and expanded exhaust gas outlet, a transfer line for carrying the compressed fluid from the compressor outlet to the at least one turbine inlet with throttling means for controlling the compressed fluid transfer to the turbine, characterized in that it comprises an exhaust gas recirculation line between the exhaust gas outlet of the turbine and the intake of the compressor.

The recirculation line can originate at the point of intersection with the expanded exhaust gas line and it can end at a point of intersection with the delivery line.

The recirculation line can comprise throttling means for controlling recirculation of the exhaust gas in this line.

The device can comprise additional throttling means arranged downstream from the point of intersection with the expanded exhaust gas line for compelling the exhaust gas to flow into the recirculation line.

The device can comprise additional throttling means arranged upstream from the point of intersection with the delivery line for compelling the exhaust gas to flow into the recirculation line.

The throttling means can comprise a proportional valve.

The device can comprise a heat exchanger for cooling the exhaust gas coming from the turbine.

The device can comprise after-treatment means for the exhaust gas leaving the turbine.

The invention also relates to a method of controlling the amount of air fed to the intake of a supercharged internal-combustion engine comprising at least one turbocharger with a compression stage including at least one compressor with an intake for the fluid to be compressed, an expansion stage with at least one turbine having at least one exhaust gas inlet and expanded exhaust gas outlet connected to an expanded exhaust gas line, a transfer line for carrying the compressed fluid from the compressor outlet to the at least one turbine inlet with throttling means for controlling the compressed fluid transfer to the turbine, characterized in that part of the exhaust gas leaving the turbine is diverted and fed to the intake of the compressor.

Exhaust gas recirculation between the turbine and the compressor can be controlled by throttling means.

BRIEF DESCRIPTION OF THE FIGURES

Other features and advantages of the invention will be clear from reading the description hereafter, given by way of non limitative example, with reference to the accompanying figures illustrating an internal-combustion engine with a Boost circuit and an EGR circuit.

DETAILED DESCRIPTION OF THE INVENTION

Figure 1:
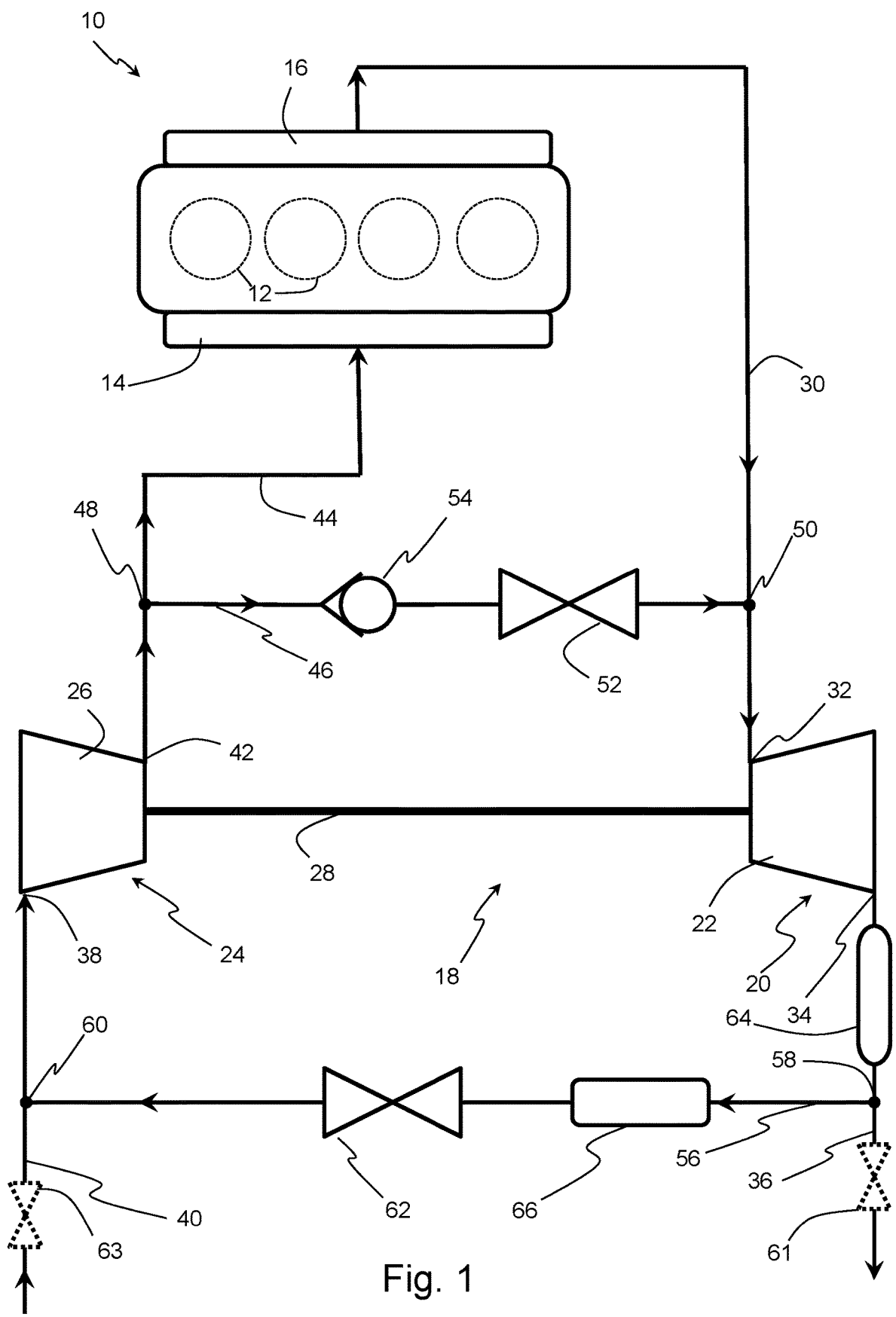
In FIG. 1, internal-combustion engine 10 is a direct-injection internal-combustion engine, notably of diesel type, but this does not preclude any other type of internal-combustion engine.

Preferably, this engine comprises at least two cylinders 12, four cylinders here, with, for each cylinder, intake means (not shown) with at least one intake valve controlling an intake pipe and leading to an intake manifold 14, and exhaust means (not shown) for the exhaust gas, with at least one exhaust valve controlling each an exhaust pipe and leading to an exhaust manifold 16.

The intake 14 and exhaust 16 manifolds are connected to a turbocharger 18 used for compression of the air fed to intake manifold 14.

Figure 2:
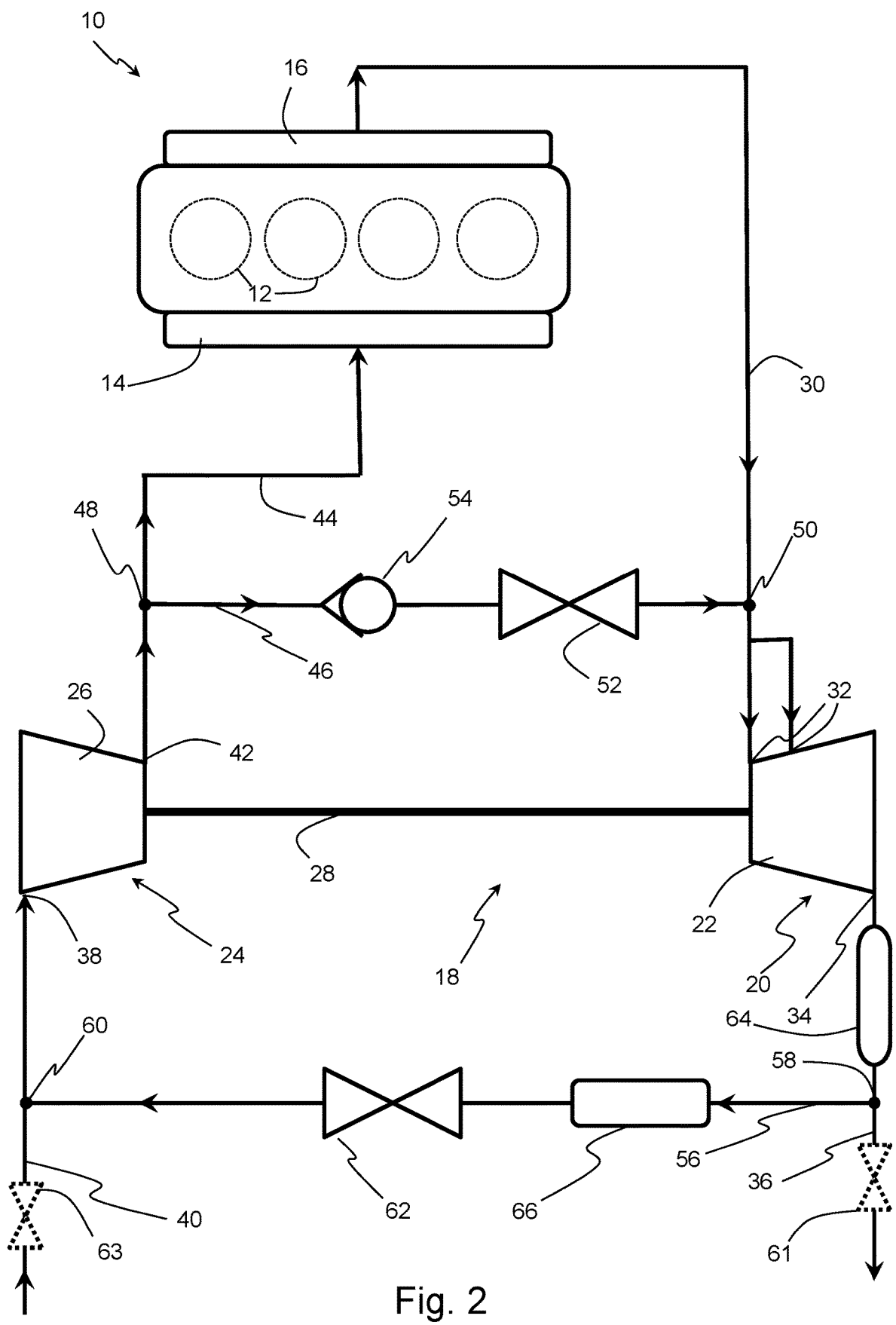
FIG. 2 illustrates an embodiment including a twin-scroll turbocharger.

As illustrated in FIG. 1, the turbocharger is a single-scroll turbocharger but the invention is not limited to such a turbocharger, it is also applicable to twin-scroll turbochargers, or even to turbochargers with n scrolls, with n greater than or equal to 2. FIG. 2 illustrates an embodiment including a twin-scroll turbocharger.

As illustrated in FIG. 1, the single-scroll turbocharger comprises an expansion stage 20 with at least one expansion turbine 22 and a compression stage 24 with at least one compressor 26 rotatably connected by a shaft 28 to the turbine.

The turbine is scavenged by the exhaust gas coming from the exhaust manifold through an exhaust gas line 30 connecting this manifold to turbine inlet 32.

Exhaust gas outlet 34 of the turbine is conventionally connected to the engine exhaust pipe through an expanded exhaust gas line 36.

Compressor 26 of the turbocharger comprises a fluid intake 38 supplied by a delivery line 40 carrying outside air or a mixture of air and exhaust gas, as explained below. Compressed fluid outlet 42 of this compressor is connected to intake manifold 14 by a compressed fluid line 44.

Advantageously, a cooling exchanger (not shown) can be provided on line 44, between compressor 26 and intake manifold 14.

As can be better seen in FIGS. 1 and 2, a transfer line 46 allows to circulate part of the compressed air (or of a mixture of air and exhaust gas) leaving compressor 26 towards turbine inlet 32.

More precisely, this partial transfer line originates from line 44, at an intersection point 48, and connects, from another intersection point 50, with exhaust gas line 30 which leads to the turbine inlet.

This transfer line 46 carries throttling means 52, such as a proportional valve, controlled by any means known to the person skilled in the art. This valve thus allows to control the compressed air circulation in this line between points 48 and 50.

This line also comprises a non-return valve 54 that prevents exhaust gas circulation from exhaust line 30 to compressed fluid line 44.

Thus, the fluid intensifier circuit referred to as Boost circuit comprises a portion of line 44 (between compressor outlet 42 and intersection point 48 on line 44), transfer line 46 with valve 52 and non-return valve 54, and a portion of line 30 between intersection point 50 and turbine inlet 32.

Advantageously, valve 52 can be arranged upstream or downstream from non-return valve 54 depending on the resistance thereof to the high temperatures on the exhaust side.

This engine also comprises a recirculated exhaust gas line 56 that originates at a point 58 of line 36 carrying the expanded exhaust gas from turbine 22 and leads to a point of intersection 60 with delivery line 40 of compressor 26. This line carries throttling means 62, such as a proportional valve, allowing to control the exhaust gas circulation in the line.

These throttling means can be supplemented by additional throttling means 61, 63, such as a proportional valve, arranged downstream from point 58 (valve 61) and/or upstream from point 60 (valve 63), which allow to compel the exhaust gas to pass into line 56.

Thus, for additional valve 61, the opening/closing degree of this valve allows to control the flow of gas after intersection point 58 and therefore the flow of gas that is diverted towards line 56.

The opening/closing degree of valve 63 allows the depression in line 40 between the compressor intake and point 60 to be varied, with the result that the flow of exhaust gas is controlled from point 60.

Preferably, an exhaust gas after-treatment means 64 is provided on expanded exhaust gas line 36 between exhaust gas outlet 34 of turbine 22 and point of intersection 58 with line 56.

This after-treatment means, such as an exhaust gas purification catalyst (optionally associated with a particle filter), allows to remove a very large part of the contaminants at the outlet, so as to obtain exhaust gas practically free of contaminants likely to clog the compressor.

Advantageously, line 56 can carry a heat exchanger 66 to provide cooling of the recirculated exhaust gas before mixing thereof with air at point 60.

This thus forms an exhaust gas recirculation circuit, referred to as Low-Pressure EGR circuit, with a portion of line 36 between turbine outlet 34 and intersection point 58, line 56 with valve 62 (and optionally the heat exchanger) and a portion of line 40 between intersection point 60 and intake 30 of compressor 26.

During operation, in case a large amount of air is required in the cylinders, opening of valve 52 of the Boost circuit is controlled so as to feed compressed air from compressor 26 into turbine 22 through transfer line 46, and closing of valve 62 of the EGR circuit is concomitantly controlled.

The compressed air exiting compressor 26 circulates in line 46, then in line 36 prior to reaching inlet 32 of turbine 22, thus providing surplus fluid supply to this turbine.

Thus, the turbine is traversed not only by the exhaust gas from exhaust manifold 16, but also by compressed air that comes on top of this gas. Therefore, the rotation of the turbine is increased, which causes an increase in the rotation of the compressor and, consequently, an increase in the pressure of the compressed air exiting this compressor.

In this configuration, the engine runs without EGR since valve 62 is closed.

To operate with exhaust gas recirculation in order to limit the combustion temperatures and therefore NOx emissions, valve 52 of the Boost circuit is closed and valve 62 of the EGR circuit is open.

According to the desired proportion of recirculated exhaust gas at the engine intake, the additional throttling means arranged downstream from point 58 and/or upstream from point 60 can be controlled so as to compel the exhaust gas to pass into line 56.

A portion of the exhaust gas leaving turbine 22 is thus fed into line 56 and mixes with the air of line 40 prior to being admitted to intake 38 of compressor 26.

A mixture of compressed air and exhaust gas is thus sent to intake manifold 14 to supply cylinders 12.

For an optimized simultaneous operation of the EGR circuit and the Boost circuit, valves 52 and 62 are open.

As previously described, the additional throttling means can be controlled depending on the desired proportion of recirculated exhaust gas.

Thus, the compressed gases (air+exhaust gas) leaving compressor 26 circulate in transfer line 46 and they reach inlet 32 of turbine 22 where they provide surplus fluid supply to this turbine. Simultaneously, a portion of the expanded exhaust gas from turbine 22 is fed to line 56 so as to mix with the air circulating in delivery line 40 prior to being fed to the compressor.

It is thus possible to significantly increase the amount of exhaust gas fed to the engine cylinders without however increasing the mixture richness thanks to the concomitant increase in the outside air flow and the exhaust gas flow.

Furthermore, the performances in terms of engine emissions reduction at source can be increased by the joint use of the Boost circuit and the EGR circuit.

It can further be noted that control of the exhaust gas flow diverted by the Boost circuit also adds a degree of freedom to the control of EGR rates.

Thus, the combination of Boost and EGR adjustments allows to adjust an EGR mass associated with a cylinder richness.

The invention claimed is:

1. A device for controlling the amount of air fed to the intake of a supercharged internal-combustion engine, the device comprising:
    a delivery line;
    an expanded exhaust gas line;
    at least one turbocharger including:
        a compression stage including at least one compressor including an intake for a fluid to be compressed connected to the delivery line, and
        an expansion stage including at least one turbine including at least one exhaust gas inlet and an expanded exhaust gas outlet connected to the expanded exhaust gas line;
    a transfer line for carrying the fluid compressed by the at least one compressor from an outlet of the at least one compressor to the at least one exhaust gas inlet of the at least one turbine, the transfer line comprising a proportional valve for controlling transfer of the fluid compressed by the at least one compressor to the at least one turbine and a non-return valve, the non-return valve preventing exhaust gas circulation from an exhaust line connected to the at least one exhaust gas inlet of the at least one turbine to a compressed fluid line connected to the outlet of the at least one compressor;
    an exhaust gas recirculation line, the exhaust gas recirculation line being between the expanded exhaust gas outlet of the at least one turbine and the intake of the at least one compressor, the exhaust gas recirculation line originating at a point of intersection with the expanded exhaust gas line and ending at a point of intersection with the delivery line, the exhaust gas recirculation line comprising a proportional valve for controlling recirculation of exhaust gas in the exhaust gas recirculation line; and
    an after-treatment catalyst for exhaust gas leaving the at least one turbine, the after-treatment catalyst positioned between the expanded exhaust gas outlet of the at least one turbine and the point of intersection of the exhaust gas recirculation line with the expanded exhaust gas line.

2. The device as claimed in claim 1, further comprising throttling means arranged downstream from the point of intersection of the exhaust gas recirculation line with the expanded exhaust gas line, the throttling means for compelling exhaust gas to flow into the exhaust gas recirculation line.

3. The device as claimed in claim 1, further comprising throttling means arranged upstream from the point of intersection of the exhaust gas recirculation line with the delivery line, the throttling means for compelling exhaust gas to flow into the exhaust gas recirculation line.

4. The device as claimed in claim 1, further comprising a heat exchanger for cooling the exhaust gas coming from the at least one turbine.

5. An assembly comprising a supercharged internal-combustion engine and the device as claimed in claim 1.

6. A diesel engine comprising the device as claimed in claim 1.

7. The device as claimed in claim 1, wherein the at least one turbocharger comprises a twin-scroll turbocharger.

8. A method of controlling the amount of air fed to the intake of a supercharged internal-combustion engine comprising at least one turbocharger including a compression stage including at least one compressor including an intake for a fluid to be compressed, an expansion stage including at least one turbine including at least one exhaust gas inlet and an expanded exhaust gas outlet, a transfer line for carrying the fluid compressed by the at least one compressor from an outlet of the at least one compressor to the at least one exhaust gas inlet of at least one turbine, the transfer line comprising a proportional valve for controlling transfer of the fluid compressed by the at least one compressor to the at least one turbine and a non-return valve, the non-return valve preventing exhaust gas circulation from an exhaust line connected to the at least one exhaust gas inlet of the at least one turbine to a compressed fluid line connected to the outlet of the at least one compressor, an exhaust gas recirculation line, the exhaust gas recirculation line being between the expanded exhaust gas outlet of the at least one turbine and the intake of the at least one compressor, the exhaust gas recirculation line originating at a point of intersection with an expanded exhaust gas line connected to the expanded exhaust gas outlet and ending at a point of intersection with a delivery line connected to the intake of the at least one compressor, the exhaust gas recirculation line comprising a proportional valve for controlling recirculation of exhaust gas in the exhaust gas recirculation line, and an after-treatment catalyst for exhaust gas leaving the at least one turbine, the after-treatment catalyst positioned between the expanded exhaust gas outlet of the at least one turbine and the point of intersection of the exhaust gas recirculation line with the expanded exhaust gas line, the method comprising:

diverting a part of exhaust gas leaving the at least one turbine, feeding the part of the exhaust gas to the intake of the at least one compressor.

9. The method as claimed in claim 8, further comprising controlling exhaust gas recirculation between the at least one turbine and the at least one compressor by the proportional valve comprised on the exhaust gas recirculation line.

10. The method as claimed in claim 8, wherein the supercharged internal-combustion engine is a diesel engine.

11. The method as claimed in claim 8, wherein the at least one turbocharger comprises a twin-scroll turbocharger.

12. The method as claimed in claim 8, further comprising controlling exhaust gas recirculation between the at least one turbine and the at least one compressor using one or more of the proportional valve comprised on the exhaust gas recirculation line, a proportional valve at a position on the expanded exhaust gas line downstream of the point of intersection with the exhaust gas recirculation line, and a proportional valve at a position on the delivery line upstream from the point of intersection with the exhaust gas recirculation line.

13. A device for controlling air fed to an internal-combustion engine, the device comprising:

a turbocharger including:

a compressor including an intake and an outlet, and a turbine including an inlet and an outlet;

a delivery line connected to the intake of the compressor;

an expanded exhaust gas line connected to the outlet of the turbine;

a transfer line for carrying a compressed fluid from the outlet of the compressor to the inlet of the turbine, the transfer line comprising a proportional valve and a non-return valve, the non-return valve preventing exhaust gas circulation from an exhaust line connected to the inlet of the turbine to a compressed fluid line connected to the outlet of the compressor;

an exhaust gas recirculation line, the exhaust gas recirculation line being between the outlet of the turbine and the intake of the compressor, the exhaust gas recirculation line comprising a proportional valve; and a catalyst positioned between the outlet of the turbine and the exhaust gas recirculation line.

14. The device according to claim 13, wherein the device comprises only one exhaust gas recirculation line.

\* \* \* \* \*